United States Patent
Oe

(10) Patent No.: US 8,423,212 B2
(45) Date of Patent: Apr. 16, 2013

(54) VEHICLE CONTROL APPARATUS

(75) Inventor: Yu Oe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 442 days.

(21) Appl. No.: 12/756,225

(22) Filed: Apr. 8, 2010

(65) Prior Publication Data

US 2010/0274424 A1 Oct. 28, 2010

(30) Foreign Application Priority Data

Apr. 24, 2009 (JP) ................................. 2009-106718

(51) Int. Cl.
*B60L 11/00* (2006.01)
*B60L 9/00* (2006.01)

(52) U.S. Cl.
USPC ............................ 701/22; 701/103; 290/40 R

(58) Field of Classification Search .................. None
See application file for complete search history.

(56) References Cited

U.S. PATENT DOCUMENTS

| 5,962,927 | A  | * | 10/1999 | Inada et al. ................. 290/40 R |
| 7,506,639 | B2 |   | 3/2009  | Saito |
| 8,180,508 | B2 | * | 5/2012  | Kawai ............................ 701/22 |
| 2009/0071444 | A1 | * | 3/2009 | Takagi et al. ................. 123/447 |

FOREIGN PATENT DOCUMENTS

| JP | 08308019 A | 11/1996 |
| JP | 10002240 A | 1/1998 |
| JP | 2007309301 A | 11/2007 |
| JP | 2008-155813 A | 7/2008 |
| JP | 2008201300 A | 9/2008 |

* cited by examiner

*Primary Examiner* — Luna Champagne
(74) *Attorney, Agent, or Firm* — Gifford, Krass, Sprinkle, Anderson & Citkowski, P.C.

(57) ABSTRACT

A control apparatus for a vehicle that includes an internal combustion engine, a fuel tank, a canister trapping vaporized fuel from the fuel tank, an open-close valve provided in a passage connecting an intake passage of the engine to the canister, a generator driven by the engine to generate electric power, a battery storing electric power generated by the generator, and a motor driven by electric power discharged from the battery, and that runs using driving force from at least any one of the engine and the motor, includes: a determination unit determining whether to control the open-close valve to introduce the trapped fuel into the intake passage; and a charge and discharge controller executing changes any one of the rate of charging of the battery and the rate of discharging of the battery when the determination unit determines to introduce the trapped fuel into the intake passage.

15 Claims, 6 Drawing Sheets

VEHICLE CONTROL APPARATUS

INCORPORATION BY REFERENCE

The disclosure of Japanese Patent Application No. 2009-106718 filed on Apr. 24, 2009 including the specification, drawings and abstract is incorporated herein by reference in its entirety.

BACKGROUND OF THE INVENTION

1. Field of the Invention

The invention relates to a vehicle control apparatus and, more particularly, to a technique for changing any one of the rate of charging of a battery and the rate of discharging of the battery in a hybrid vehicle that runs using driving force from at least one of an internal combustion engine and a motor when vaporized fuel trapped in a canister is introduced to an intake passage of the internal combustion engine.

2. Description of the Related Art

There is known an exhaust gas recirculation (EGR) system that recirculates exhaust gas to an intake passage of an internal combustion engine. Owing to the EGR system, it is possible to reduce unburned fuel, pumping loss, and the like.

Japanese Patent Application Publication No. 2008-155813 (JP-A-2008-155813) describes a vehicle control apparatus that executes high-precision EGR control without causing a shock or a knocking when an internal combustion engine is started during deceleration of a hybrid vehicle.

The vehicle control apparatus described in JP-A-2008-155813 is a control apparatus for a vehicle that uses an internal combustion engine and a rotating electrical machine as drive sources. The vehicle includes the rotating electrical machine and a power split mechanism. The rotating electrical machine is coupled to an output shaft of the internal combustion engine, and generates electric power on the basis of the power of the internal combustion engine. The power split mechanism transmits the power of the internal combustion engine to wheel axles of the vehicle. The power split mechanism splits the power, that is the input from the internal combustion engine, into driving force to the wheel axles and power to the rotating electrical machine.

The internal combustion engine is equipped with an exhaust gas recirculation system. The exhaust gas recirculation system recirculates a part of the exhaust gas of the internal combustion engine to the intake passage of the internal combustion engine via a recirculation valve. The control apparatus includes: a detecting unit; a first control unit and a second control unit. The detecting unit detects a physical quantity related to a vehicle speed. The first control unit controls the recirculation valve, the internal combustion engine and the rotating electrical machine in a first mode when the condition that the vehicle is decelerating and the internal combustion engine is being started holds and then the speed based on the detected physical quantity is higher than or equal to a predetermined speed set in association with a pressure in the intake passage. The second control unit controls the recirculation valve, the internal combustion engine and the rotating electrical machine in a second mode different from the first mode when the above condition holds and then the speed based on the detected physical quantity is lower than the predetermined speed.

With the above described control apparatus, when the speed is higher than or equal to the predetermined speed, it is possible to maintain a state where the throttle valve opening degree is increased. In the state where the throttle valve opening degree is increased, it is possible to suppress an increase in pressure difference between an intake side and an exhaust side. At this time, when the recirculation valve, the internal combustion engine and the rotating electrical machine are controlled in the first mode, it is possible to improve control precision during a transient state of control over the recirculation valve of the exhaust gas recirculation system. Because the precision of EGR control improves, it is possible to suppress occurrence of torque fluctuations or a knocking even when the ignition timing is advanced or even when EGR control is started at the same time with a start of the engine during deceleration of the vehicle. In addition, when the speed is lower than the predetermined speed, the throttle valve opening degree may be decreased. In this case, for example, when the recirculation valve, the internal combustion engine and the rotating electrical machine are controlled in the second mode that is different from the first mode, so as to decrease the degree of change in advance of the ignition timing of the internal combustion engine due to control for increasing the opening degree of the recirculation valve decreases, the degree of change in ignition timing during a transient state of EGR control may be decreased. By so doing, it is possible to execute high-precision EGR control by suppressing occurrence of a knocking. Therefore, even when EGR control is started at the same time with a start of the engine during deceleration of the vehicle, it is possible to suppress occurrence of torque fluctuations or a knocking.

However, when the exhaust gas is recirculated into the intake passage of the internal combustion engine, a negative pressure in the intake passage of the internal combustion engine decreases (pressure increases) as compared with when no exhaust gas is recirculated. Thus, purge of vaporized fuel trapped in the canister may be impaired.

SUMMARY OF THE INVENTION

The invention provides a vehicle control apparatus that is able to purge vaporized fuel trapped in a canister even when exhaust gas is recirculated to an intake passage of an internal combustion engine.

A first aspect of the invention relates to a control apparatus for a vehicle that is equipped with an internal combustion engine, a fuel tank, a canister that traps vaporized fuel from the fuel tank, an open-close valve that is provided in a passage that connects an intake passage of the internal combustion engine to the canister, a generator that is driven by the internal combustion engine to generate electric power, a battery that stores electric power generated by the generator, and a motor that is driven by electric power discharged from the battery, and that runs using driving force from at least any one of the internal combustion engine and the motor. The control apparatus includes: a determination unit that determines whether to control the open-close valve so as to introduce the fuel, trapped in the canister, into the intake passage; and a charge and discharge controller that executes control such that one of a rate of charging of the battery and a rate of discharging of the battery is changed when the determination unit determines to introduce the fuel, that is trapped in the canister, into the intake passage.

With the above aspect, it is determined whether to control the open-close valve provided in the passage that connects the intake passage of the internal combustion engine to the canister so as to introduce fuel, trapped in the canister, into the intake passage, that is, so as to purge vaporized fuel. When the fuel trapped in the canister is introduced into the intake passage, purge of vaporized fuel may be insufficient, for example, when a negative pressure in the intake passage is insufficient because of EGR. Then, in order to ensure the negative pressure, when vaporized fuel is purged, any one of the rate of charging of the battery and the rate of discharging of the battery is changed. When the rate of charging of the battery is decreased, the amount of electric power generated by the generator reduces. When the rate of discharging of the battery is increased, the proportion of the power from the motor with respect to the power required for traveling the vehicle, or the like, increases. In any case, the power that should be output from the internal combustion engine can reduce. In addition, when the rate of charging of the battery is increased, the amount of electric power generated by the generator increases. When the rate of discharging of the battery is decreased, the proportion of the power from the motor with respect to the power required for traveling the vehicle decreases. In any case, the power that should be output from the internal combustion engine can increase. In any case where the output power from the internal combustion engine decreases and where the output power increases, it is possible to increase the negative pressure in the intake passage of the internal combustion engine (decrease the pressure). Thus, it is possible to provide a vehicle control apparatus that is able to purge vaporized fuel trapped in the canister even when exhaust gas is recirculated to the intake passage of the internal combustion engine.

A second aspect of the invention relates to a control method for a vehicle that is equipped with an internal combustion engine, a fuel tank, a canister that traps vaporized fuel from the fuel tank, an open-close valve that is provided in a passage that connects an intake passage of the internal combustion engine to the canister, a generator that is driven by the internal combustion engine to generate electric power, a battery that stores electric power generated by the generator, and a motor that is driven by electric power discharged from the battery, and that runs using driving force from at least any one of the internal combustion engine and the motor. The control method includes: determining whether to control the open-close valve so as to introduce the fuel, trapped in the canister, into the intake passage; and changing one of a rate of charging of the battery and a rate of discharging of the battery when it is determined to introduce the fuel, that is trapped in the canister, into the intake passage.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
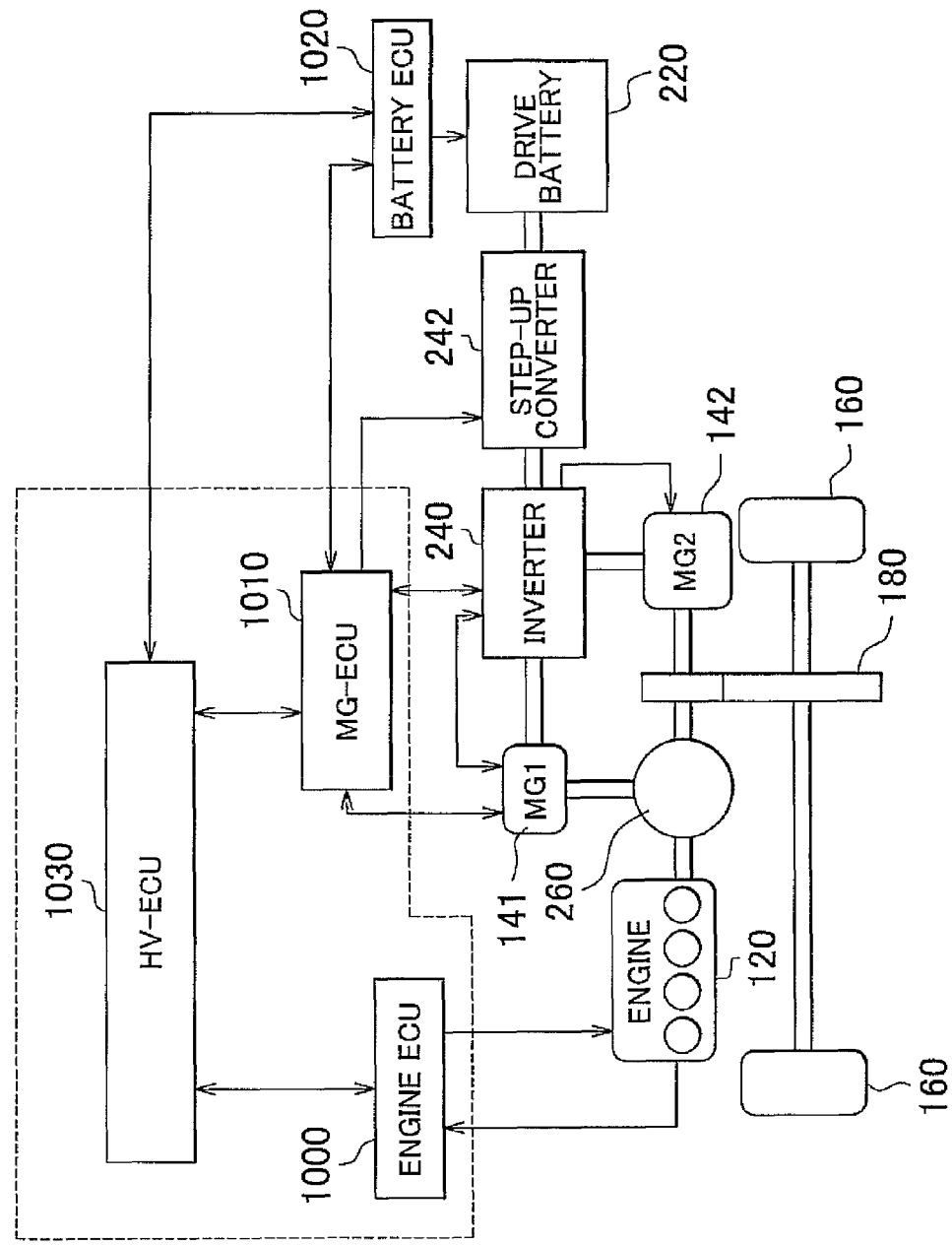
FIG. 1 is a schematic view that shows a hybrid vehicle.

Hereinafter, an embodiment of the invention will be described with reference to the accompanying drawings. In the following description, like reference numerals denote the same components. The names and functions of them are also the same. Thus, the detailed description thereof will not be repeated.

First Embodiment

A hybrid vehicle, which is an example of a vehicle, will be described with reference to FIG. 1. Note that the aspect of the invention may be applied to vehicles other than the hybrid vehicle.

The hybrid vehicle includes an internal combustion engine (hereinafter, simply referred to as engine) 120, a first motor generator (MG) 141 and a second MG 142. The engine 120 is, for example, a gasoline engine or a diesel engine. For example, the engine 120 and the second MG 142 are used as drive sources. That is, the hybrid vehicle runs using driving force from at least one of the engine 120 and the second MG 142. Note that the first MG 141 and the second MG 142 each function as a generator or function as a motor depending on the driving state of the hybrid vehicle.

The hybrid vehicle is equipped with a reduction gear 180, a power split mechanism 260, a drive battery 220, an inverter 240, a step-up converter 242, an engine electronic control unit (ECU) 1000, an MG-ECU 1010, a battery ECU 1020, and an HV-ECU 1030.

The reduction gear 180 transmits driving force, generated by the engine 120, the first MG 141 and the second MG 142, to drive wheels 160, or transmits driving force from the drive wheels 160 to the engine 120, the first MG 141 and the second MG 142.

The power split mechanism 260 distributes driving force generated by the engine 120 to two paths, that is, the first MG 141 and the drive wheels 160. For example, a planetary gear is used for the power split mechanism 260. The engine 120 is coupled to a planetary carrier. The first MG 141 is coupled to a sun gear. The second MG 142 and an output shaft (drive wheels 160) are coupled to a ring gear. By controlling the rotational speed of the first MG 141, the power split mechanism 260 can function as a continuously variable transmission.

The drive battery 220 stores electric power for driving the first MG 141 and the second MG 142. The inverter 240 converts the direct current of the drive battery 220 into alternating current or converts the alternating current of the first MG 141 and the second MG 142 into direct current. The step-up converter 242 converts voltage between the drive battery 220 and the inverter 240.

The engine ECU 1000 controls the engine 120. The MG-ECU 1010 controls the first MG 141, the second MG 142, the battery ECU 1020 and the inverter 240 depending on the state of the hybrid vehicle. The battery ECU 1020 controls the step-up converter 242 and the charge and discharge states of the drive battery 220.

The HV-ECU 1030 manages the engine ECU 1000, the MG-ECU 1010 and the battery ECU 1020 to control the overall hybrid system so that the hybrid vehicle can be operated in the most efficient way.

Note that, in FIG. 1, the ECUs are separately formed; instead, two or more ECUs may be formed as an integrated ECU (for example, as indicated by the dotted line in FIG. 1, an ECU that integrates the engine ECU 1000, the MG-ECU 1010 and the HV-ECU 1030 may be used).

The hybrid vehicle is controlled so as to run using only the driving force from the second MG 142 when the efficiency of the engine 120 is low, such as when the vehicle starts to run or when the vehicle is running at low speed.

When the vehicle runs normally, the hybrid vehicle is controlled so as to run using driving force from both the engine 120 and the second MG 142. For example, the drive wheels 160 are driven by one of the driving forces into which the driving force of the engine 120 is split by the power split mechanism 260. The first MG 141 is driven for power generation by the other one of the split driving forces. The second MG 142 is driven by electric power generated by the first MG 141. By so doing, the engine 120 is assisted by the second MG 142.

When the vehicle runs at a high speed, electric power from the drive battery 220 is supplied to the second MG 142 to increase the output of the second MG 142 so as to add driving force to the drive wheels 160. When the vehicle decelerates, the second MG 142 driven by the drive wheels 160 functions as a generator to regenerate electric power. The regenerated electric power is stored in the drive battery 220.

When the state of charge (SOC) of the drive battery 220 is low, the output power of the engine 120 is increased to increase the amount of electric power generated by the first MG 141. The drive battery 220 is charged with electric power generated by the first MG 141.

In the present embodiment, the HV-ECU 1030 sets a target power that includes a power (power calculated as a product of torque and rotational speed) required for the hybrid vehicle to run, the rate of charging of the drive battery 220, and the like. The power required for the hybrid vehicle to run is, for example, determined on the basis of an accelerator operation amount and a vehicle speed. Note that a target driving force, a target acceleration, a target torque, or the like, may be determined instead of the target power.

The HV-ECU 1030 controls the engine ECU 1000, the MG-ECU 1010 and the battery ECU 1020 so that an output power from the engine ECU 1000 and an output power from the second MG 141 share the target power.

That is, the power output from the engine ECU 1000 and the power output from the second MG 141 are determined so that the sum of the power output from the engine ECU 1000 and the power output from the second MG 141 is equal to the target power. The engine 120 and the second MG 142 are controlled so as to achieve the output powers determined respectively for the engine 120 and the second MG 142.

Thus, for example, when the rate of discharging of the drive battery 220 is increased, the proportion of the power from the second MG 142 with respect to the power required for traveling the vehicle increases. As a result, the power that should be output from the engine 120 decreases.

On the other hand, when the rate of discharging of the drive battery 220 is decreased, the proportion of the power from the second MG 142 with respect to the power required for traveling the vehicle decreases. As a result, the power that should be output from the engine 120 increases.

Note that, when the rate of charging of the drive battery 220 is decreased, the amount of electric power generated by the first MG 141 decreases, so the power that should be output from the engine 120 decreases by the amount of reduction in electric power generated. When the rate of charging of the drive battery 220 is increased, the amount of electric power generated by the first MG 141 increases, so the power that should be output from the engine 120 increases by the amount of increase in electric power generated.

Figure 2:
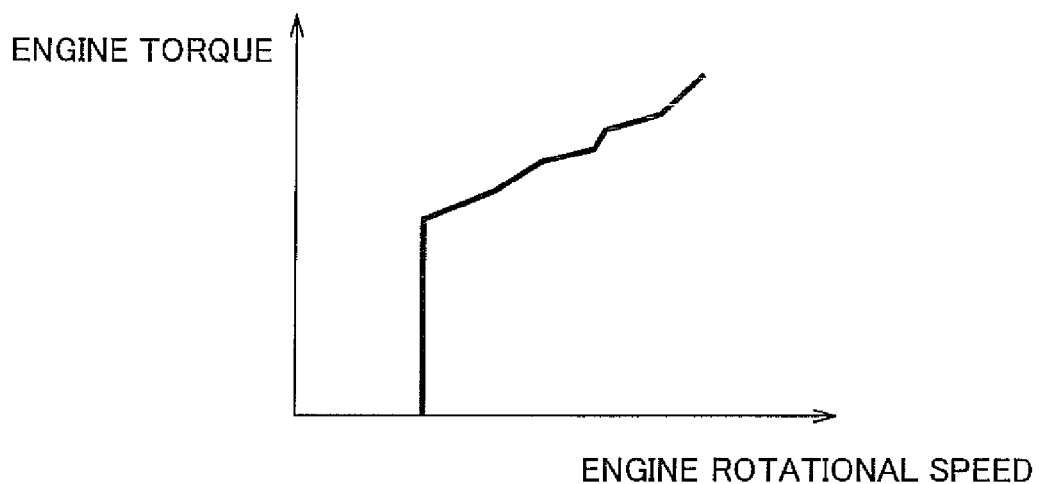
FIG. 2 is a graph that shows the locus of engine torque and engine rotational speed for desirable fuel efficiency.

In the present embodiment, as shown in FIG. 2, the engine 120 is controlled so as to achieve engine torque and engine rotational speed that can give appropriate fuel efficiency with respect to the power that should be output from the engine 120.

The engine torque and the engine rotational speed that give optimal fuel efficiency are, for example, determined by a developer so as to achieve optimal fuel efficiency within the range that satisfies various conditions related to drivability, and the like, on the basis of the results of experiments and simulations in development of the hybrid vehicle.

In addition, in the present embodiment, the HV-ECU 1030 instructs the MG-ECU 1010 and the battery ECU 1020 so that the SOC of the drive battery 220 is equal to a predetermined target value (control center value).

Figure 3:
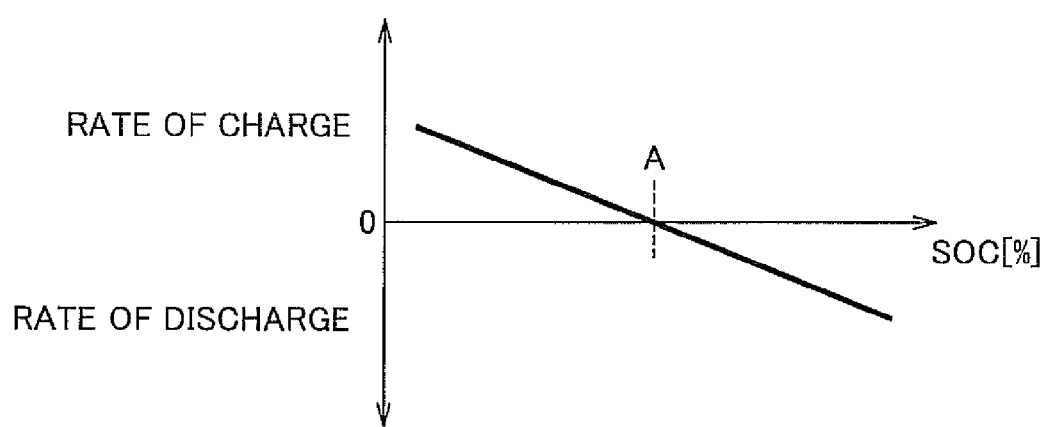
FIG. 3 is a graph that shows the rate of charging of a drive battery and the rate of discharging of the drive battery.

As shown in FIG. 3, when the SOC of the drive battery 220 is lower than a target value A, the drive battery 220 is charged. As the SOC of the drive battery 220 decreases with respect to the target value A, the rate of charging (charging electric power) of the drive battery 220 is increased.

On the other hand, when the SOC of the drive battery 220 is higher than the target value A, electric power is discharged from the drive battery 220. As the SOC of the drive battery 220 increases with respect to the target value A, the rate of discharging (discharging electric power) of the drive battery 220 is increased.

The target value of SOC of the drive battery 220 is, for example, set by the HV-ECU 1030. The target value set by the HV-ECU 1030 is transmitted to the MG-ECU 1010 and the battery ECU 1020.

The battery ECU 1020 calculates the SOC of the drive battery 220 by, for example, monitoring the discharge current of the drive battery 220, charging current of the drive battery 220, the voltage of the drive battery 220, and the like. The HV-ECU 1030 receives a signal that indicates SOC from the battery ECU 1020.

Note that a generally known technique may be used as a method for control, such that the SOC of the drive battery 220 is equal to the target value and a method of calculating the SOC, so further detailed description will not be repeated here.

Figure 4:
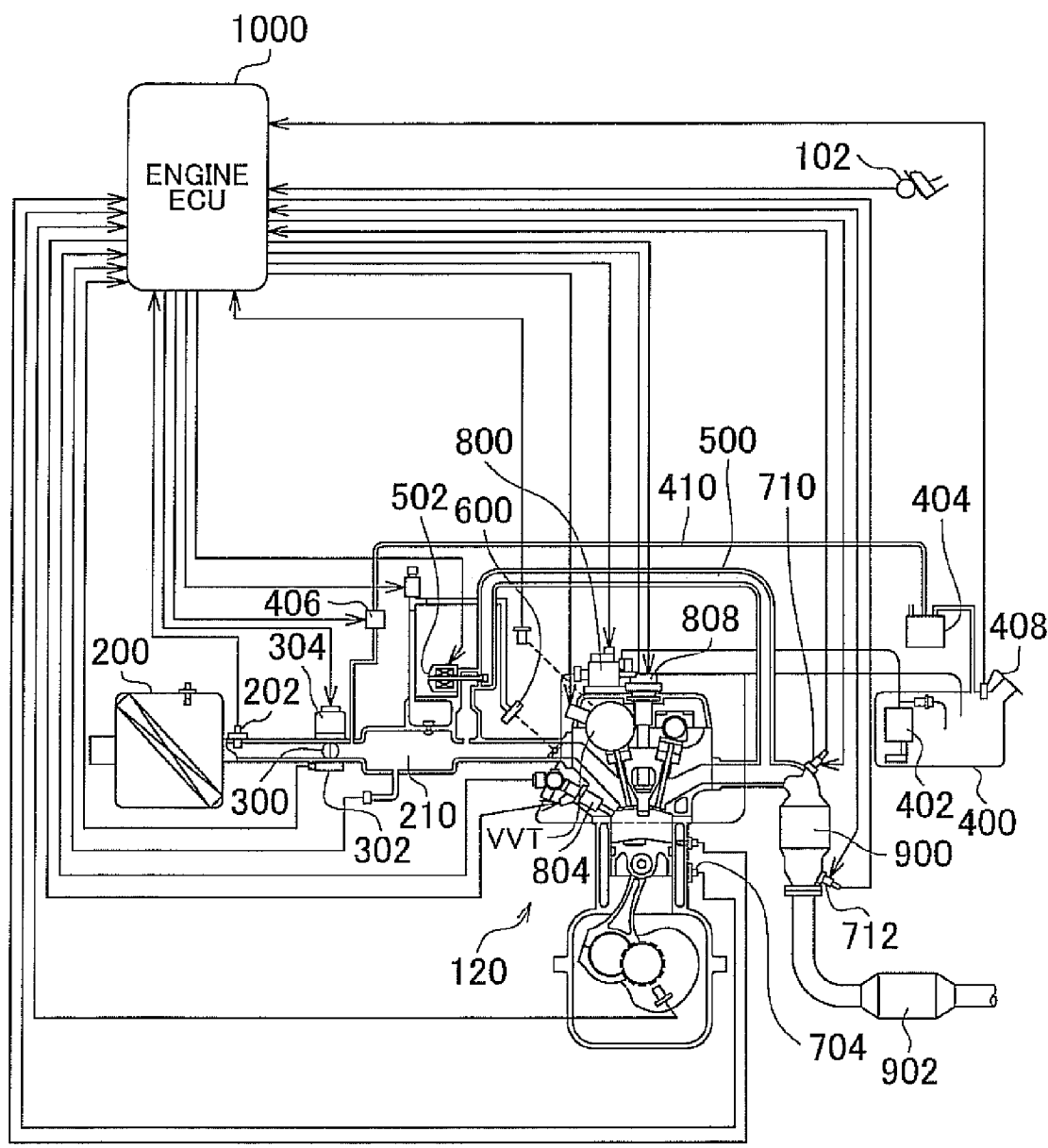
FIG. 4 is a view that shows an engine.

The engine 120 controlled by the engine ECU 1000 will be further described with reference to FIG. 4.

Air drawn through an air cleaner 200 is introduced into a combustion chamber of the engine 120 via an intake passage 210. An intake air flow rate is detected by an air flow meter 202, and the engine ECU 1000 receives a signal that indicates the intake air flow rate. The intake air flow rate changes on the basis of the opening degree of a throttle valve 300. The opening degree of the throttle valve 300 is changed by a throttle motor 304 that operates on the basis of a signal from the engine ECU 1000. The opening degree of the throttle valve 300 is detected by a throttle position sensor 302, and the engine ECU 1000 receives a signal that indicates the opening degree of the throttle valve 300.

Fuel is stored in a fuel tank 400, and is injected by a fuel pump 402 from an injector 804 into the combustion chamber via a high-pressure fuel pump 800. A mixture of air introduced from an intake manifold and fuel injected from the fuel tank 400 into the combustion chamber via the injector 804 is ignited by an ignition plug 808. Note that, instead of or in addition to an in-cylinder injector that injects fuel into the inside of a cylinder, a port injection injector that injects fuel into an intake port may be provided.

Vaporized fuel from the fuel tank 400 is trapped by a charcoal canister 404. For example, as the pressure inside the fuel tank 400 exceeds a threshold, vaporized fuel trapped by the charcoal canister 404 is purged into the intake passage 210. The vaporized fuel purged into the intake passage 210 is drawn into the combustion chamber and is burned.

The rate of purge is controlled by a canister purge vacuum switching valve (VSV) 406. The canister purge VSV 406 is provided in a passage 410 that connects the charcoal canister 404 to the intake passage 210. As the canister purge VSV 406 is opened, vaporized fuel is purged. As the canister purge VSV 406 is closed, purge of vaporized fuel is stopped.

The canister purge VSV 406 is controlled by the engine ECU 1000. For example, the engine ECU 1000 outputs a duty signal to the canister purge VSV 406 to thereby control the opening degree of the canister purge VSV 406.

The pressure inside the fuel tank 400 is detected by a pressure sensor 408, and a signal that indicates the pressure is transmitted to the engine ECU 1000. The HV-ECU 1030 receives a signal that indicates the pressure inside the fuel tank 400 from the engine ECU 1000. Other than that, the HV-ECU 1030 receives a signal that indicates parameters of the operating state of the engine, such as engine rotational speed, via the engine ECU 1000.

Exhaust gas passes through an exhaust manifold, and is exhausted to the atmosphere through a three-way catalyst converter 900 and a three-way catalyst converter 902.

Part of exhaust gas is recirculated to the intake passage 210 via an EGR pipe 500 of an EGR system. The flow rate of exhaust gas recirculated by the EGR system is controlled by an EGR valve 502. The EGR valve 502 is duty-controlled by the engine ECU 1000. The engine ECU 1000 controls the opening degree of the EGR valve 502 on the basis of various signals, such as an engine rotational speed and a signal from an accelerator position sensor 102.

The EGR system recirculates part of exhaust gas, exhausted from the engine, to an intake system, and mixes the exhaust gas with fresh air-fuel mixture to decrease combustion temperature. Thus, unburned fuel, pumping loss, nitrogen oxides (NOx), knocking, and the like, are reduced.

The concentration of oxygen in exhaust gas is detected by signals from oxygen sensors 710 and 712 for feedback control over the air-fuel ratio. The engine ECU 1000 receives a signal that indicates the concentration of oxygen, and the air-fuel ratio of air-fuel mixture is detected from the concentration of oxygen in exhaust gas.

The engine ECU 1000 calculates an optimum ignition timing on the basis of signals from the sensors, and outputs an ignition signal to an ignition plug 808. For example, the ignition timing is calculated on the basis of engine rotational speed, cam position, intake air flow rate, throttle valve opening degree, engine coolant temperature, and the like.

The calculated ignition timing is corrected by a knock control system. As a knocking is detected by a knock sensor 704, the ignition timing is retarded by predetermined angles until the knocking stops. On the other hand, as the knocking stops, the ignition timing is advanced by predetermined angles.

Figure 5:
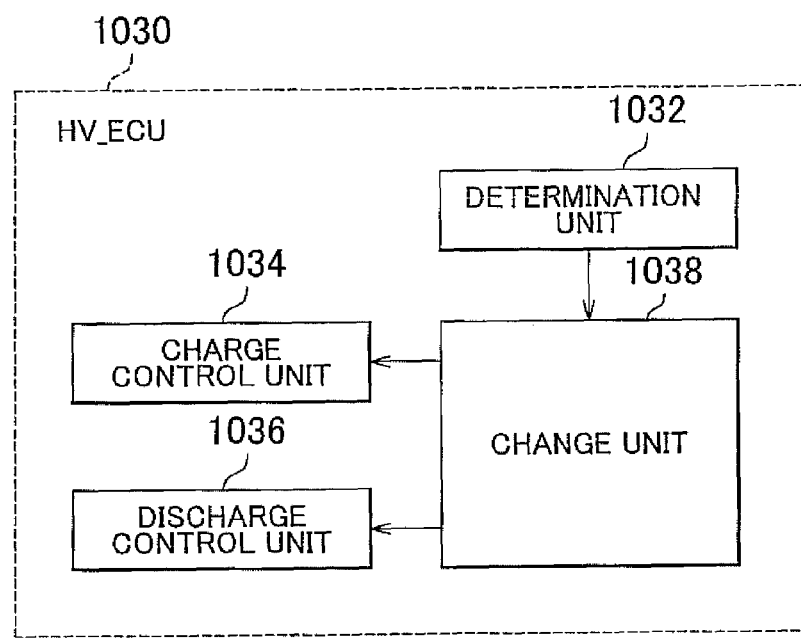
FIG. 5 is a functional block diagram of an HV-ECU.

The function of the HV-ECU 1030 will be described with reference to FIG. 5. Note that the function described below may be implemented by software or may be implemented by hardware. In addition, the MG-ECU 1010 or the battery ECU 1020 may have the function described below.

The HV-ECU 1030 includes a determination unit 1032, a charge control unit 1034, a discharge control unit 1036, and a change unit 1038.

The determination unit 1032 determines whether to control the canister purge VSV 406 so as to introduce fuel, trapped in the charcoal canister 404, into the intake passage 210, that is, so as to purge vaporized fuel. For example, when the pressure inside the fuel tank 400 is higher than a threshold, the determination unit 1032 determines to control the canister purge VSV 406 so as to introduce fuel, trapped in the charcoal canister 404, into the intake passage 210. Note that a method of determining whether to purge vaporized fuel is not limited to the above method.

The charge control unit 1034 executes control such that the rate of charging (charging electric power) of the drive battery 220 is increased as the SOC of the drive battery 220 decreases with respect to a target value.

The discharge control unit 1036 executes control such that the rate of discharging (discharging electric power) of the drive battery 220 is increased as the SOC of the drive battery 220 increases with respect to the target value.

The change unit 1038 changes any one of the rate of charging of the drive battery 220 and the rate of discharging of the drive battery 220 when fuel trapped in the charcoal canister 404 is introduced into the intake passage 210.

Figure 6:
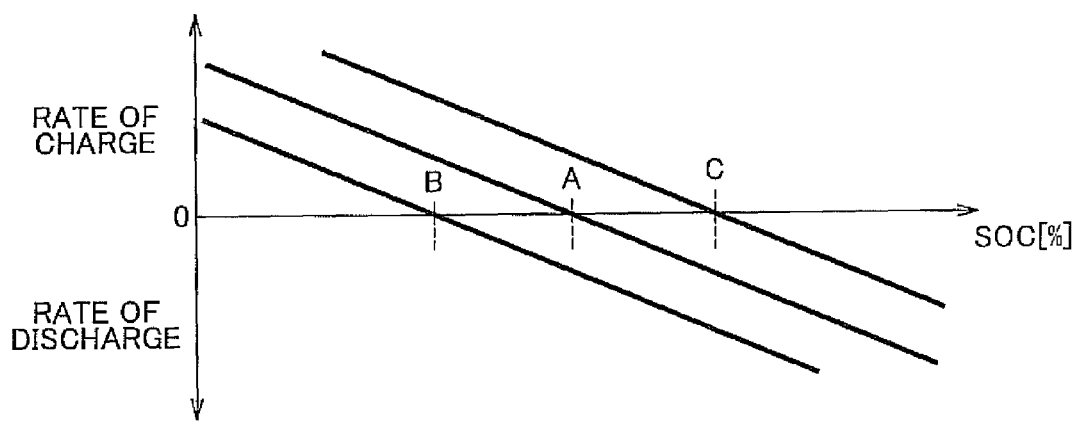
FIG. 6 is a graph that shows a target value of SOC of the drive battery.

More specifically, when the SOC of the drive battery 220 is lower than the target value, the target value is decreased to thereby decrease the rate of charging of the drive battery 220. For example, as shown in FIG. 6, the target value is decreased from "A" to "B (B<A)". Note that decreasing the rate of charging includes changing a state where the drive battery 220 is charged to a state where the drive battery 220 is discharged.

In addition, when the SOC of the drive battery 220 is higher than the target value, the target value is increased to thereby decrease the rate of discharging of the drive battery 220. For example, as shown in FIG. 6, the target value is increased from "A" to "C (C>A)". Note that decreasing the rate of discharging includes changing a state where the drive battery 220 is discharged to a state where the drive battery 220 is charged.

Figure 7:
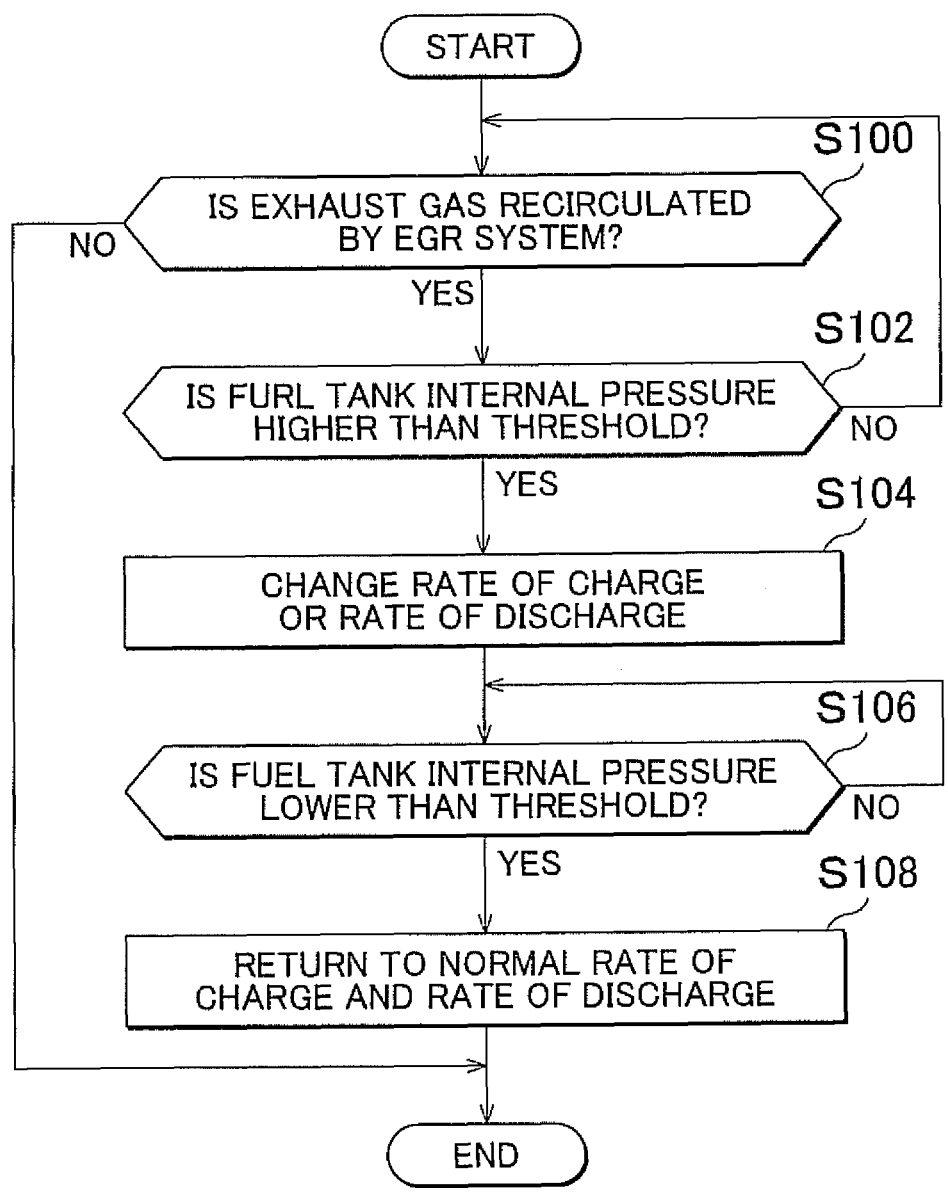
FIG. 7 is a flowchart that shows the control structure of a program executed by the HV-ECU.

The control structure of a program executed by the HV-ECU 1030 will be described with reference to FIG. 7. Note that the MG-ECU 1010 or the battery ECU 1020 may execute the program described below.

In step (hereinafter, step is abbreviated to "S") 100, the HV-ECU 1030 determines whether exhaust gas is recirculated to the combustion chamber by the EGR system on the basis of a signal transmitted from the engine ECU 1000. When exhaust gas is recirculated to the combustion chamber by the EGR system (YES in S100), the process proceeds to S102. Otherwise (NO in S100), the process ends.

In S102, the HV-ECU 1030 determines whether the pressure inside the fuel tank 400 is higher than a threshold. When the pressure inside the fuel tank 400 is higher than the threshold (YES in S102), the process proceeds to S104. Otherwise (NO in S102), the process returns to S100.

In S104, the HV-ECU 1030 changes the rate of charging of the drive battery 220 or the rate of discharging of the drive battery 220. In the present embodiment, by changing the target value of the SOC of the drive battery 220, the rate of charging of the drive battery 220 or the rate of discharging of the drive battery 220 is changed.

In S106, the HV-ECU 1030 determines whether the pressure inside the fuel tank 400 is lower than the threshold. When the pressure inside the fuel tank 400 is lower than the threshold (YES in S106), the process proceeds to S108. Otherwise (NO in S106), the process returns to S106.

In S108, the HV-ECU 1030 returns the rate of charging of the drive battery 220 and the rate of discharging of the drive battery 220 to the normal rate of charge and rate of discharge.

The operation of the hybrid vehicle based on the above described structure and flowchart will be described.

When exhaust gas is not recirculated into the combustion chamber by the EGR system (NO in S100), it is possible to maintain a state where the negative pressure in the intake passage 210 is high (pressure is low). Therefore, when the canister purge VSV 406 is opened, vaporized fuel trapped in the charcoal canister 404 may be purged.

Figure 8:
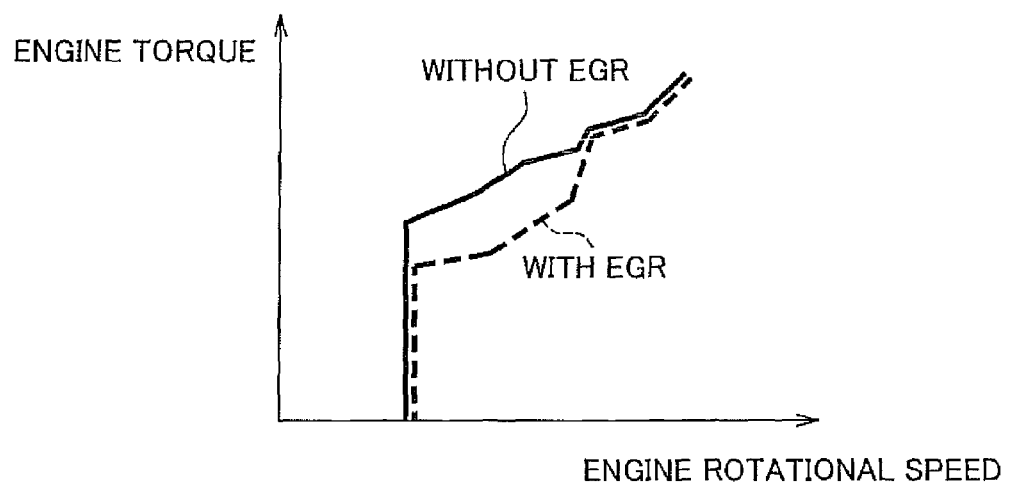
FIG. 8 is a graph that shows the locus of engine torque and engine rotational speed when exhaust gas is recirculated to a combustion chamber by an EGR system.

When exhaust gas is recirculated to the combustion chamber by the EGR system (YES in S100), the negative pressure in the intake passage 210 decreases (pressure increases). If the engine 120 is controlled so as to maintain the negative pressure while maintaining the power that should be output from the engine 120, as indicated by the broken line in FIG. 8, the engine torque and the engine rotational speed may be different from the engine torque and the engine rotational speed that can give appropriate fuel efficiency.

On the other hand, even when exhaust gas is recirculated to the combustion chamber by the EGR system (YES in S100), and when the engine torque is large and the engine rotational speed is high or when the engine torque is small and the engine rotational speed is low, a negative pressure necessary to purge vaporized fuel may be ensured, and the engine torque and the engine rotational speed may be adjusted to the engine torque and the engine rotational speed that can give appropriate fuel efficiency.

Then, when the pressure inside the fuel tank 400 is higher than the threshold (YES in S102), that is, when vaporized fuel is purged, the rate of charging of the drive battery 220 or the rate of discharging of the drive battery 220 is changed in order to change the power that should be output from the engine 120 (S104). Specifically, by changing the target value of the SOC of the drive battery 220, the rate of charging of the drive battery 220 or the rate of discharging of the drive battery 220 is changed.

When the SOC of the drive battery 220 is lower than the target value, the target value is decreased. By so doing, a difference between the SOC of the drive battery 220 and the target value reduces. As the SOC of the drive battery 220 decreases with respect to the target value, the rate of charging of the drive battery 220 is further increased. Therefore, as the difference between the SOC of the drive battery 220 and the target value reduces, the rate of charging of the drive battery 220 is decreased. When the rate of charging of the drive battery 220 is decreased, the amount of power generated by the first MG 141 reduces. As a result, the power that should be output from the engine 120 reduces.

In addition, when the target value is changed so as to be lower than the SOC of the drive battery 220, the drive battery 220 is promptly discharged rather than the drive battery 220 is charged. As the drive battery 220 is discharged, the proportion of the power from the second MG 142 to the power required for traveling the vehicle increases. Therefore, the power that should be output from the engine 120 decreases.

In any case, the operating state of the engine 120 may be placed in a state where the engine torque is small and the engine rotational speed is low. Therefore, even when exhaust gas is recirculated into the intake passage 210 of the engine 120, it is possible to ensure a negative pressure necessary for purging vaporized fuel. Furthermore, the engine torque and the engine rotational speed may be adjusted to the engine torque and the engine rotational speed that can give appropriate fuel efficiency.

On the other hand, when the SOC of the drive battery 220 is higher than the target value, the target value is increased. By so doing, a difference between the SOC of the drive battery 220 and the target value reduces. As the SOC of the drive battery 220 increases with respect to the target value, the rate of discharging of the drive battery 220 is increased. Therefore, as the difference between the SOC of the drive battery 220 and the target value reduces, the rate of discharging of the drive battery 220 is decreased. When the rate of discharging of the drive battery 220 is decreased, the proportion of the power from the second MG 142 with respect to the power required for traveling the vehicle decreases. As a result, the power that should be output from the engine 120 increases.

In addition, when the target value is changed so as to be higher than the SOC of the drive battery 220, the drive battery 220 is promptly charged rather than the drive battery 220 is discharged. By so doing, the amount of electric power generated by the first MG 141 is increased by the amount of electric power required for charging the drive battery 220. Therefore, the power that should be output from the engine 120 increases by the amount of increase in electric power generated.

In any case, the operating state of the engine 120 may be placed in a state where the engine torque is large and the engine rotational speed is high. Therefore, even when exhaust gas is recirculated into the intake passage 210 of the engine 120, it is possible to ensure a negative pressure necessary for purging vaporized fuel. Furthermore, the engine torque and the engine rotational speed may be adjusted to the engine torque and the engine rotational speed that can give appropriate fuel efficiency.

After that, when the pressure inside the fuel tank 400 is lower than the threshold (YES in S106), the rate of charging of the drive battery 220 and the rate of discharging of the drive battery 220 are returned to the normal rate of charge and rate of discharge (S108).

Second Embodiment

Hereinafter, a second embodiment of the invention will be described. In the present embodiment, instead of changing the target value of the SOC of the drive battery 220, a variation in rate of charging of the drive battery 220 is increased with respect to a variation in difference between the SOC of the drive battery 220 and the target value. In addition, a variation in rate of discharging of the drive battery 220 is increased with respect to a variation in difference between the SOC of the drive battery 220 and the target value.

The other structure is similar to that of the above described first embodiment. Therefore, the detailed description thereof will not be repeated here.

Figure 9:
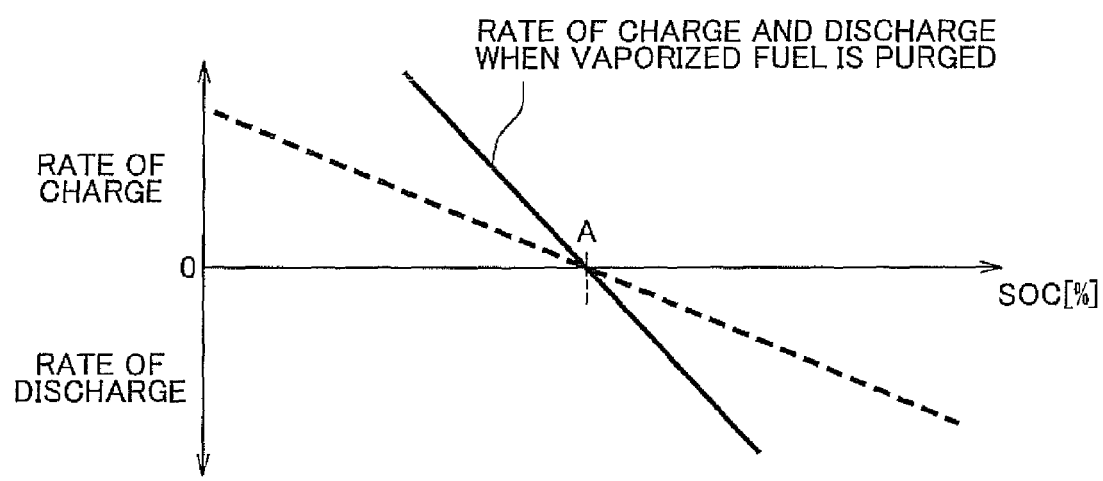
FIG. 9 is a graph that shows the rate of charging of the drive battery and the rate of discharging of the drive battery, which are changed to become steep.

As shown in FIG. 9, when fuel, trapped in the charcoal canister 404, is introduced into the intake passage 210, a variation in the rate of charging of the drive battery 220 is increased with respect to a variation in difference between the SOC of the drive battery 220 and the target value. In addition, a variation in the rate of discharging of the drive battery 220 is increased with respect to a variation in difference between the SOC of the drive battery 220 and the target value.

That is, the gradient of the rate of charging of the drive battery 220 and the gradient of the rate of discharging of the drive battery 220 are made steep with respect to the difference between the SOC of the drive battery 220 and the target value.

By so doing, when the SOC of the drive battery 220 is lower than the target value, the rate of charging of the drive battery 220 is increased. When the rate of charging of the drive battery 220 is increased, the amount of electric power generated by the first MG 141 increases. Therefore, the power that should be output from the engine 120 increases by the amount of increase in electric power generated. Thus, the operating state of the engine 120 may be placed in a state where the engine torque is large and the engine rotational speed is high. Therefore, even when exhaust gas is recirculated into the intake passage 210 of the engine 120, a negative pressure necessary to purge vaporized fuel may be ensured, and the engine torque and the engine rotational speed may be adjusted to the engine torque and the engine rotational speed that can give appropriate fuel efficiency.

Similarly, when the SOC of the drive battery 220 is higher than the target value, the rate of discharging of the drive battery 220 is increased. When the rate of discharging of the drive battery 220 is increased, the proportion of the power from the second MG 142 with respect to the power required for traveling the vehicle increases. Therefore, the power that should be output from the engine 120 decreases. Thus, the operating state of the engine 120 may be placed in a state where the engine torque is small and the engine rotational speed is low. Therefore, even when exhaust gas is recirculated into the intake passage 210 of the engine 120, a negative pressure necessary to purge vaporized fuel may be ensured, and the engine torque and the engine rotational speed may be adjusted to the engine torque and the engine rotational speed that can give appropriate fuel efficiency.

In the aspect of the invention, the control apparatus may further include an SOC controller that executes control such that the rate of charging of a battery is increased as the state of charge of the battery is decreased with respect to a target value. A charge and discharge controller may decrease the rate of charging of the battery by decreasing the target value when the state of charge of the battery is lower than the target value.

With the above aspect of the invention, when vaporized fuel, trapped in a canister, is purged, the rate of charging of the battery is decreased. By so doing, the amount of electric power generated by a generator is reduced. Thus, it is possible to reduce the power output from an internal combustion engine so that the negative pressure in an intake passage of the internal combustion engine increases (pressure decreases).

In the aspect of the invention, the control apparatus may further include an SOC controller that executes control such that the rate of discharging of a battery is increased as the state of charge of the battery increases with respect to a target value. A charge and discharge controller may decrease the rate of discharging of the battery by increasing the target value when the state of charge of the battery is higher than the target value.

With the above aspect of the invention, when vaporized fuel, trapped in a canister, is purged, the rate of discharging of the battery is decreased. By so doing, the proportion of the power from a motor with respect to the power required for traveling the vehicle decreases. Thus, it is possible to increase the power output from an internal combustion engine so that the negative pressure in an intake passage of the internal combustion engine increases (pressure decreases).

In the aspect of the invention, the control apparatus may further include an SOC controller that executes control such that the rate of charging of a battery is increased as the state of charge of the battery decreases with respect to a target value. The control apparatus may increase the rate of charging of the battery by increasing a variation in rate of charging of the battery with respect to a variation in difference between the state of charge of the battery and the target value.

With the above aspect of the invention, when vaporized fuel, trapped in a canister, is purged, a variation in rate of charging of the battery is increased with respect to a variation in difference between the state of charge of the battery and the target value. That is, the gradient of the rate of charging of the battery is made steep with respect to a difference between the state of charge of the battery and the target value. Thus, the rate of charging of the battery is increased. By so doing, the amount of electric power generated by a generator increases. Thus, it is possible to increase the power output from an internal combustion engine so that the negative pressure in an intake passage of the internal combustion engine increases (pressure decreases).

In the aspect of the invention, the control apparatus may further include an SOC controller that executes control such that the rate of discharging of a battery is increased as the state of charge of the battery increases with respect to a target value. The control apparatus may increase the rate of discharging of the battery by increasing a variation in rate of discharging of the battery with respect to a variation in difference between the state of charge of the battery and the target value.

With the aspect of the invention, when vaporized fuel, trapped in a canister, is purged, a variation in rate of discharging of the battery is increased with respect to a variation in difference between the state of charge of the battery and the target value. That is, the gradient of the rate of discharging of the battery is made steep with respect to a difference between the state of charge of the battery and the target value. Thus, the rate of discharging of the battery is increased. By so doing, the percentage of the power from a motor with respect to the power required for traveling the vehicle increases. Thus, it is possible to reduce the power output from an internal combustion engine so that the negative pressure in an intake passage of the internal combustion engine increases (pressure decreases).

The aspect of the invention may be configured to include both the first embodiment and the second embodiment. By so doing, it is possible to achieve the engine torque and the engine rotational speed that can give further appropriate fuel efficiency.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A control apparatus for a vehicle that is equipped with an internal combustion engine, a fuel tank, a canister that traps vaporized fuel from the fuel tank, an open-close valve that is provided in a passage that connects an intake passage of the internal combustion engine to the canister, a generator that is driven by the internal combustion engine to generate electric power, a battery that stores electric power generated by the generator, and a motor that is driven by electric power discharged from the battery, and that runs using driving force from at least any one of the internal combustion engine and the motor, the control apparatus comprising:

a determination unit that determines whether to control the open-close valve so as to introduce the fuel, trapped in the canister, into the intake passage; and a charge and discharge controller that executes control such that one of a rate of charging of the battery and a rate of discharging of the battery is changed when the determination unit determines to introduce the fuel, that is trapped in the canister, into the intake passage.

2. The control apparatus according to claim 1, further comprising:

an SOC controller that executes control such that the rate of charging of the battery is increased as the state of charge of the battery decreases with respect to a target value, wherein the charge and discharge controller decreases the rate of charging of the battery by decreasing the target value when the state of charge of the battery is lower than the target value.

3. The control apparatus according to claim 1, further comprising an SOC controller that executes control such that the rate of discharging of the battery is increased as the state of charge of the battery increases with respect to a target value,
wherein the charge and discharge controller decreases the rate of discharging of the battery by increasing the target value when the state of charge of the battery is higher than the target value.

4. The control apparatus according to claim 2, wherein:
the SOC controller executes control such that the rate of discharging of the battery is increased as the state of charge of the battery increases with respect to the target value; and
the charge and discharge controller decreases the rate of discharging of the battery by increasing the target value when the state of charge of the battery is higher than the target value.

5. The control apparatus according to claim 1, further comprising an SOC controller that executes control such that the rate of charging of the battery is increased as the state of charge of the battery decreases with respect to a target value,
wherein the charge and discharge controller increases the rate of charging of the battery by increasing a variation in the rate of charging of the battery with respect to a variation in difference between the state of charge of the battery and the target value.

6. The control apparatus according to claim 2, wherein:
the SOC controller executes control such that the rate of charging of the battery is increased as the state of charge of the battery decreases with respect to the target value; and
the charge and discharge controller increases the rate of charging of the battery by increasing a variation in the rate of charging of the battery with respect to a variation in difference between the state of charge of the battery and the target value.

7. The control apparatus according to claim 3, wherein:
the SOC controller executes control such that the rate of charging of the battery is increased as the state of charge of the battery decreases with respect to the target value; and
the charge and discharge controller increases the rate of charging of the battery by increasing a variation in the rate of charging of the battery with respect to a variation in difference between the state of charge of the battery and the target value.

8. The control apparatus according to claim 1, further comprising an SOC controller that executes control such that the rate of discharging of the battery is increased as the state of charge of the battery increases with respect to a target value, wherein
the charge and discharge controller increases the rate of discharging of the battery by increasing a variation in the rate of discharging of the battery with respect to a variation in difference between the state of charge of the battery and the target value.

9. The control apparatus according to claim 2, wherein:
the SOC controller executes control such that the rate of discharging of the battery is increased as the state of charge of the battery increases with respect to the target value; and
the charge and discharge controller increases the rate of discharging of the battery by increasing a variation in the rate of discharging of the battery with respect to a variation in difference between the state of charge of the battery and the target value.

10. The control apparatus according to claim 3, wherein:
the SOC controller that executes control such that the rate of discharging of the battery is increased as the state of charge of the battery increases with respect to the target value; and
the charge and discharge controller increases the rate of discharging of the battery by increasing a variation in the rate of discharging of the battery with respect to a variation in difference between the state of charge of the battery and the target value.

11. The control apparatus according to claim 5, wherein:
the SOC controller executes control such that the rate of discharging of the battery is increased as the state of charge of the battery increases with respect to the target value; and
the charge and discharge controller increases the rate of discharging of the battery by increasing a variation in the rate of discharging of the battery with respect to a variation in difference between the state of charge of the battery and the target value.

12. The control apparatus according to claim 1, wherein the determination unit detects an internal pressure in the fuel tank, and opens the open-close valve when the internal pressure is lower than a threshold.

13. A control method for a vehicle that is equipped with an internal combustion engine, a fuel tank, a canister that traps vaporized fuel from the fuel tank, an open-close valve that is provided in a passage that connects an intake passage of the internal combustion engine to the canister, a generator that is driven by the internal combustion engine to generate electric power, a battery that stores electric power generated by the generator, and a motor that is driven by electric power discharged from the battery, and that runs using driving force from at least any one of the internal combustion engine and the motor, comprising:
providing a determination unit that determines whether to control the open-close valve so as to introduce the fuel, trapped in the canister, into the intake passage; and
providing a charge and discharge controller that changes one of a rate of charging of the battery and a rate of discharging of the battery when it is determined to introduce the fuel, that is trapped in the canister, into the intake passage.

14. The control method of claim 13, further comprising:
changing one of the rate of charging of the battery and the rate of discharging of the battery when exhaust gas is recirculated to the combustion engine and when it is determined to introduce the fuel, that is trapped in the canister, into the intake passage.

15. The control apparatus according to claim 1, wherein:
the charge and discharge controller executes the control to change one of the rate of charging of the battery and the rate of discharging of the battery when exhaust gas is recirculated to the combustion engine and when the determination unit determines to introduce the fuel, that is trapped in the canister, into the intake passage.

* * * * *